United States Patent Office 3,218,880
Patented Nov. 23, 1965

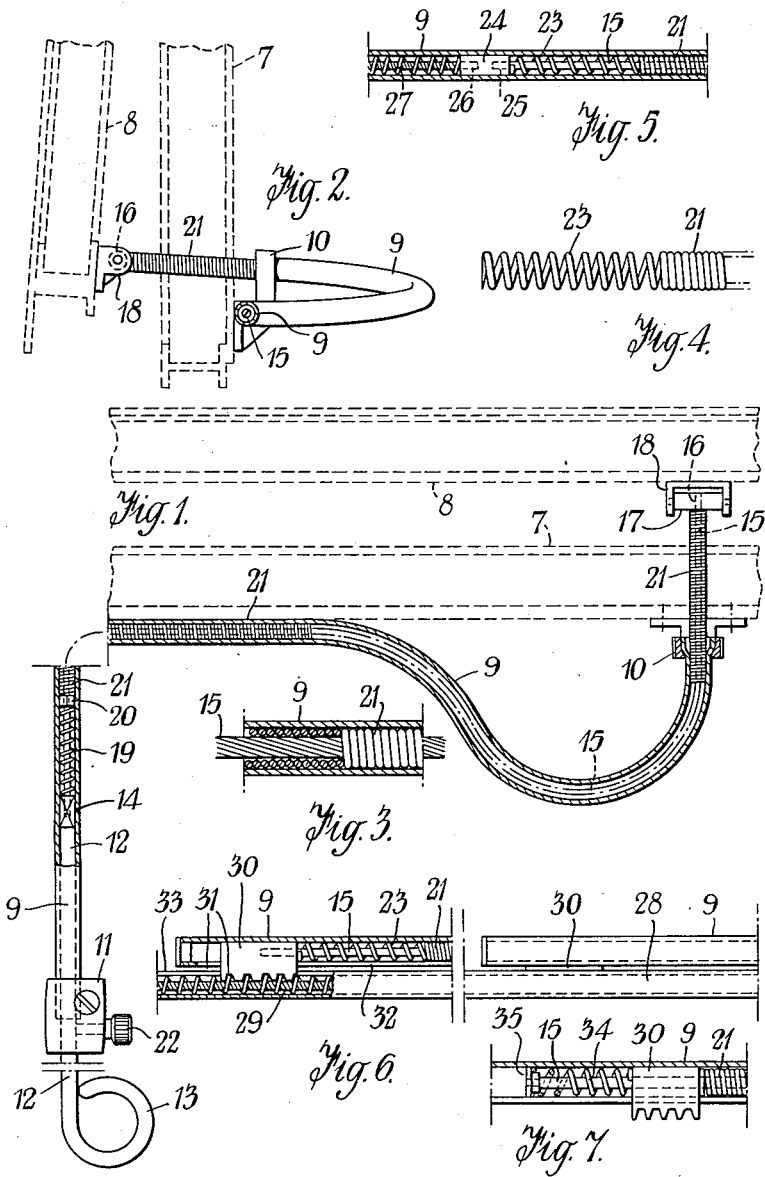

3,218,880
CONTROLS
James Sydney Bentley, London, England, assignor to Teleflex Products Limited, London, England, a British company
Filed May 23, 1962, Ser. No. 196,981
Claims priority, application Great Britain, May 25, 1961, 18,923/61
5 Claims. (Cl. 74—502)

This invention relates to flexible multi-stranded metal cable controls of the type mounted for movement in a guiding conduit, which transmit a "push" for the positive movement of the controlled part to which one end portion of the cable is connected, and in which said end portion passes out from and is unsupported by the guiding conduit when the controlled part is positively moved, and has for its object to provide means whereby said unsupported part of the cable is rendered more rigid than hitherto, with all the advantages that flow therefrom.

In general, a flexible multi-stranded metal cable control in accordance with the invention comprises a multi-stranded flexible metal cable with helices of long pitch, similar to but possibly more flexible than those utilised for the transmitting of positive effort by tension, and has secured to one end thereof a fitting adapted to slide easily in a guiding conduit hereafter referred to. At the other end, this cable has secured thereto an attachment fitting by which the cable is connected to the part to be positively moved by the control.

There is threaded on the cable a compression spring of desired length and number of turns, the exterior diameter of which is a comfortable fit in the guiding conduit, which spring abuts, on the one hand, the sliding fitting.

Beyond the other end of the compression spring (and with or without an apertured separating member) there is mounted on the cable with desired clearance a plurality of short axially contacting similar annular members which extend from the compression spring to the attachment fitting secured to the other end of the cable and which are a readily sliding fit in the guiding conduit.

The arrangement is such that, when not in an associated guiding conduit, the cable is held straight with the annular members all in axial contact by the push or thrust of the compression spring, and that when the cable (surrounded by annular members) is bent, then the annular members by the relative tilting of their contacting portions, cause the axial displacement of the annular members up to the last free one adjacent the compression spring, to cause this spring to be still further compressed.

The cable with the various members attached thereto and mounted thereon, is mounted for reciprocating movement in a guiding conduit of suitable section, for example circular or square.

One open end of this conduit is fixed in a position suitably adjacent the fixed fitting on the part to be moved, to which one end of the cable is to be attached. The other end is also fixed in a suitable poistion and has connected thereto means by which the sliding fitting is moved between two extreme poistions and, if required, held in any set position.

When positively moved, the relevant end portion of the cable surrounded by contacting annular members, is pushed out or projected from the open end of the conduit and consequently is unsupported. However, by the action of the compression spring holding the annular members "solid" one behind the other, it is kept straight and rigid so that in effect it can be projected to a greater distance or resist a greater return effort, or both, than hitherto in comparable cases.

Various forms of annular members can be used, such, for example, as rings, discs or washers of desired thickness and shape. In a simple case these may be represented by the adjacent helical turns of a wire coil of suitable exterior and interior diameter and gauge and cross-section of wire, which is wound so that the adjacent turns are in contact. The exterior diameter of this coil is a ready sliding fit in the interior of the conduit and the interior diameter has adequate, even large clearance from the exterior of the multi-stranded flexible cable, which constitutes a core.

With such a construction a separate compression spring is not necessary as the compression spring could be constituted by expanding a desired number of turns at one end of the coil which encloses the cable.

In order that the invention may be better understood, it will now be described with reference to the accompanying somewhat diagrammatic drawings which are given by way of example only and in which:

FIG. 1 is a general plan view, mainly in section, of one embodiment of a control in accordance with the invention, applied to the opening and closing of a window.

FIG. 2 is a side view of the right-hand portion of FIG. 1 as seen from the left hand.

FIG. 3 is an enlargement of a fragmentary portion of FIG. 1.

FIG. 4 shows a view of one end of the coil which encloses the cable according to another method of carrying the invention into effect.

FIG. 5 shows a fragmentary portion in section of a control according to another modification of the invention.

FIG. 6 shows a fragmentary elevation, partly in section, of portions of two controls in accordance with the invention in operative relation with a trunk-line cable drive, and FIG. 7 shows a modification.

In FIGS. 1 and 2, 7 is the fixed framework portion of a window shown dotted, and 8 the movable framework of the window, also shown dotted. The upper portions of these members are not shown but they are of usual construction with the frame 8 turning on a horizontal axis at the top of the frame 7; in the drawings, the window is shown partly open.

The control comprises a guiding conduit 9 of circular section, having straight portions and curved portions. One end, which terminates a bent swan-neck portion, is fixed in a bracket 10 which is fixed to the framework 7 of the window. The other end is fixed in a clampable and bored fitting 11 to be secured in any suitable position according to the "run" of the conduit 9.

It will be understood that this portion of the conduit could be horizontal, or disposed vertically as shown. In this other end and through the fitting 11 is adapted to slide a rod 12 terminating on the exterior in a handle 13. The upper end of the rod is bored and squared on the exterior at 14 so that it comes in gripping relation with one end of a multi-stranded flexible metal cable 15 (shown enlarged in FIG. 3) with helices of long pitch, similar to but preferably more flexible than those utilised for transmitting positive effort by tension. The other end 16 of this cable 15 is fixedly secured within a trunnion 17 carried by a bracket 18 fixed to the movable framework 8 of the window and so situated that when the window is closed the centre of the trunnion is coincident with the centre of the swan-neck end of the conduit 9.

On the end of the cable 15 which is fixed to the rod 12 at 14, there is threaded a compression spring 19 of a desired number of turns, which is a relatively loose fit in the interior of the conduit portion 19 and upon the cable 15. Beyond this spring 19 there is threaded on the cable 15 a collar 20, and between the collar 20 and the trunnion 17 there is threaded on the cable 15 a long wire coil 21 with the helical turns in contact and which turns constitute a multiplicity of annular members all in contact. The outside diameter of this coil is slightly less than the interior diameter of the conduit 9, and the interior diameter is also a loose fit around the cable 15.

When the parts are originally set up, the dimensions are such that with the window closed and the handle 13 in its outermost position, there is a desired compressive stress in the compression spring 19. As a consequence, when the window is to be opened by operating the handle 13 in such a manner that the rod 12 is pushed inwardly, the end of the rod pushes against the abutting stressed compression spring 19 which pushes, by means of the collar 20, against one end of the coil 21. As the turns of the coil are all in contact, this push is communicated throughout the length of the coil to the trunnion 17 and consequently the thrust effects the opening of the window 8.

It will be realised that by the compression spring 19 the cable 15 is, in all positions of the control, under full tension so that the unsupported portion of the coil 21 between the end of the conduit 9 having the swan-neck and the trunnion 17, is kept straight at an angle substantially a normal to the surface of the window.

To hold the window in any set open position, the milled headed screw of the fitting 11 could be tightened up.

In any usual manner, the guiding conduit 9 may be held in position by clips or carriers secured, where required, to a surface or surfaces on which the said conduit is located.

In place of forming the compression spring 19 separate from the turns of the coil 21, in some cases, and as shown in FIGS. 4 and 5, one end of the coil 21, the turns of which are normally in contact, can be opened out to constitute a compression spring as shown at 23. This dispenses with the necessity of utilising a collar such as 20.

FIG. 5 shows another method of operating the control. In this case a sliding block 24 is located in the conduit 9, and one end 25 of the cable 15 is secured thereto, the other end being connected to a trunnion such as 17 or other similar fitting. The sliding block 24 has also connected thereto one end 26 of a cable to slide in the conduit 9 and transmit push and pull. Such a cable as that known by the Registered Trade Mark "Teleflex" is suitable and is shown at 27. The conduit 9 containing the cable 27 can have any suitable "run" and include straight and curved portions. By moving the cable 27 by any of the usual means, it is caused to be reciprocated in the conduit 9 to move the cable 15 and coil 21 and spring 23 to effect the movement of the part being controlled, for example a window such as 8.

To enable a plurality of controls in accordance with the invention to be operated by a "Teleflex" cable, an arrangement such as indicated in FIG. 6 may be adopted. In this case, 28 is a guiding conduit for a "Teleflex" cable 29. This conduit 28 can include any suitable curves and straight portions, and the cable can be reciprocated by any usual means. Where a control in accordance with the invention is to be operated, a conduit such as 9 already referred to and, for example, as shown in FIG. 5, enclosing a flexible cable 15, a compression spring 23 and a coil 21, is suitably located adjacent and parallel to the guiding conduit 28. The flexible cable 15 in this case is attached to a sliding block 30 which has a toothed portion 31 projecting through a slot 32 in the conduit 9 and projecting through a slot 33 in the conduit 28 to come into meshing engagement with the helical projecting turns of the "Teleflex" cable 29. Thus, when this cable is reciprocated, the block 30 is reciprocated and imparts its movements to the cable 15, compression spring 23 and coil 21. FIG. 6 also indicates how another control in accordance with the invention may be operated from the same "Teleflex" cable, this other control being indicated in full lines at the right-hand side and showing how the block 30 projects between the two conduits 9 and 28, both of these conduits being slotted in suitable positions.

From the above, it will be understood that any suitable or desired number of controls in accordance with the invention may be mounted in fixed relation to a trunk guiding conduit 28 for a "Teleflex" cable and be simultaneously operated by the movements of said cable.

This particular type of control is suitable for the opening and closing of a plurality of similar windows or the like as it is only necessary to fit the control for each window in a window position and to connect each control to a common "Teleflex" drive cable.

According to a modification of the invention, in some cases in place of the compression spring being located between the sliding fitting and the annular axially contacting members, it may be located on the opposite side of the sliding fitting. Such a construction is shown in FIG. 7 where a toothed sliding member such as 30 is abutted on the one side by the coil 21 and on the other side by one end of a compression spring 34. In this case the cable 15 passes through a passage in the sliding member 30 and its end is secured to a cap 35 against which the other end of the compression spring 34 bears.

The invention is not limited to the precise forms or details of construction herein described, as these may be varied to suit particular requirements.

What I claim is:

1. A flexible multi-stranded metal cable control assembly for actuating a movable element relative to a stationary element, comprising a fixed guiding conduit, a fitting slidably mounted in one end of said conduit and having an inner end, reciprocating means on the exterior end of said sliding fitting, a multi-stranded metal cable having a twist of long pitch located in said conduit with one end connected to the sliding fitting and the other end projecting from the end of the conduit at a point remote from said sliding fitting, a connector for fixed attachment to said movable element, a helical wire coil with its convolutions in engagement mounted to slide in the conduit, said helical coil having external and internal diameters to provide a slight clearance between the coil and said conduit and metal cable respectively, said helical wire coil extending out of the other end of the conduit and abutting said connector and the inner coil end being located in the conduit adjacent said sliding member and axially spaced from the inner end of the sliding fitting, and a helical compression spring with its convolutions arranged in spaced apart relation extending around the cable and disposed with slight clearance space within the conduit and located between the inner end of the sliding fitting and the inner end of said helical coil, said helical compression spring being in a state of compression with one end abutting the inner end of said sliding fitting and its other end in engagement with the inner end of said helical coil.

2. A flexible multi-stranded metal cable control as claimed in claim 1, in which the compression spring is formed integrally with the helical wire coil by opening out a desired number of turns of said coil at one end.

3. A flexible multi-stranded metal cable control as claimed in claim 1, in which the sliding fitting is extended into a rod which projects from the one end of the guiding conduit and has handle operating means.

4. A flexible multi-stranded metal cable control as claimed in claim 1, in which the sliding fitting has connected thereto on the opposite end to the connection of the flexible cable, a cable adapted to transmit both pull and push which extends to an end of the guiding conduit for connection to suitable operating means.

5. A flexible multi-stranded metal cable control as claimed in claim 1, in which the sliding fitting has teeth, and the guiding conduit a longitudinal slot of desired length through which the said teeth project, a second cable having helical turns mounted in a parallel longitudinally slotted guiding conduit adjacent said first cable with the teeth on said sliding fitting operatively engaging the turns of said second cable.

References Cited by the Examiner
UNITED STATES PATENTS

| | | | |
|---|---|---|---|
| 1,798,009 | 3/1931 | Arens | 74—502 |
| 1,912,678 | 6/1933 | Winning | 74—502 |
| 1,918,792 | 7/1933 | Arens | 74—502 |
| 1,927,615 | 9/1933 | Ponti et al. | 74—501 |
| 1,983,962 | 12/1934 | Barber et al. | 74—504 |
| 2,652,245 | 9/1953 | Bentley | 74—504 X |
| 2,833,537 | 5/1958 | Hauck | 74—501 X |
| 3,039,420 | 6/1962 | Bevis et al. | |

FOREIGN PATENTS

| | | |
|---|---|---|
| 819,398 | 7/1937 | France. |
| 731,881 | 2/1943 | Germany. |

BROUGHTON G. DURHAM, *Primary Examiner.*